United States Patent [19]

Fandrich

[11] Patent Number: 4,632,163

[45] Date of Patent: Dec. 30, 1986

[54] CUTTING SYSTEM FOR TREES, VEGETATION AND OTHER OBJECTS

[76] Inventor: Helmut E. Fandrich, 2461 Sunnyside Place, Abbotsford, British Columbia, Canada, V2T 4C4

[21] Appl. No.: 752,617

[22] Filed: Jul. 8, 1985

[51] Int. Cl.$^4$ .............................................. A01G 23/02
[52] U.S. Cl. .................................. 144/336; 30/379.5; 83/587; 144/34 R; 144/34 E
[58] Field of Search ............... 144/3 D, 34 R, 34 E, 144/335, 336, 339; 30/276, 379.5; 83/586, 587, 639

[56] References Cited

U.S. PATENT DOCUMENTS 3,580,310 5/1971 Frankenberg ................. 144/34 E
3,581,786 6/1971 Bigoni .......................... 144/34 E

*Primary Examiner*—W. D. Bray
*Attorney, Agent, or Firm*—Hughes & Cassidy

[57] ABSTRACT

A simple, rugged, compact and reliable apparatus (20, 54, 55, 56, 58, 64) for cutting trees (24), vegetation and other objects, together with methods for operating such apparatus, are provided wherein a cutting blade (22, 22"), constrained for movement along a cutting path generally transverse to the tree (24) or other object being cut, is coupled to a piston/cylinder type accumulator (42/44, 42'/44', 42"/44") within which a compressible medium defines a source of stored potential energy. In the various embodiments shown, the accumulator is disabled until such time as its piston (42, 42', 42") is shifted past its top dead center position so as to fully compress the compressible medium contained therein for maximizing the amount of stored potential energy; and, a positioning mechanism comprising a second piston/cylinder combination (31/32) is provided for selectively shifting the accumulator piston (42, 42', 42") towards and past its top dead center position so as to permit the fully compressed potential energy storage medium to rapidly expand and, through the accumulator piston, drive the cutting blade (22, 22") through its cutting patch with inertial forces generated by the driven components serving to partially recompress the compressible potential energy storage medium upon completion of the cutting stroke, and wherein the positioning mechanism is used to return the accumulator piston (42, 42', 42") to its top dead center position upon dissipation of the inertial forces and thus completing the compression of the compressible medium preparatory to the next cutting stroke. One-way clutches (30, 41) and/or a latching mechanism (66, 68) are employed to control movement of the driven components.

19 Claims, 16 Drawing Figures

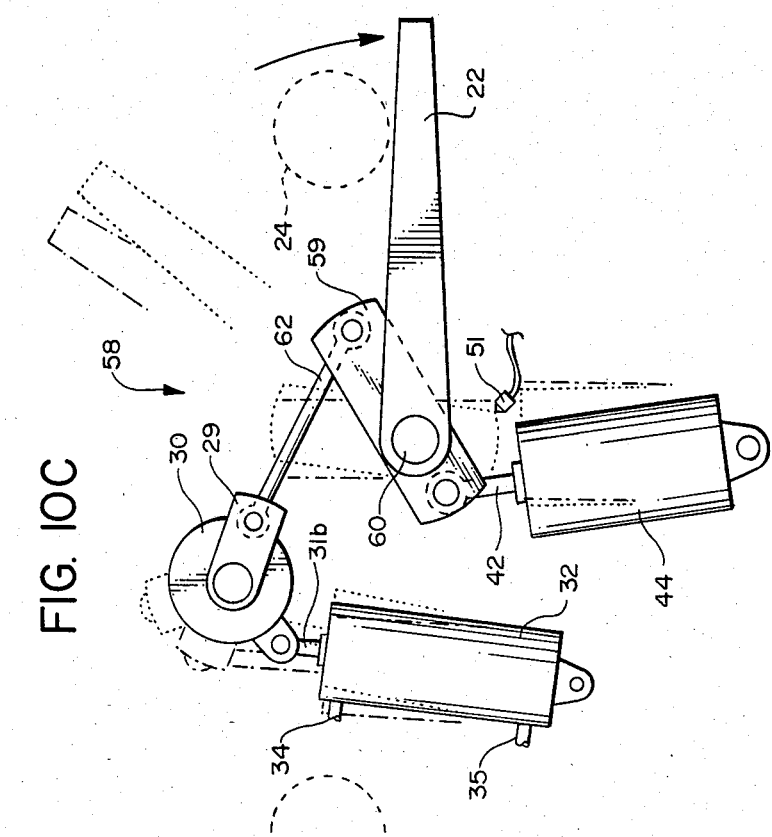
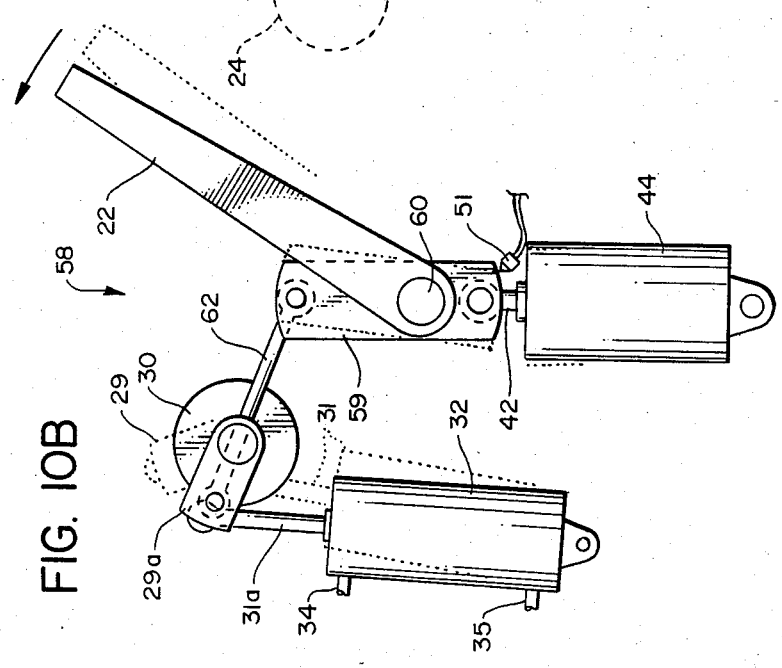

CUTTING SYSTEM FOR TREES, VEGETATION AND OTHER OBJECTS

TECHNICAL FIELD

The present invention relates generally to a cutting system for trees, vegetation and a wide range of other objects; and, more particularly, to methods and apparatus which are particularly, but by no means exclusively, suited for cutting standing timber such, for example, as the harvesting of Christmas trees and the like. In its principal aspects, the invention incorporates provisions for storing potential energy in one or more accumulators by, for example, compression of gaseous or other fluid material, or by use of compression springs or the like; and, for thereafter utilizing such stored potential energy to drive one or more cutting elements through a cutting path and wherein the inertial forces generated by at least certain of the driven components are utilized to partially recompress the expandible material in the accumulator or other potential energy storage device preparatory to positioning the apparatus in readiness for its next cutting cycle.

BACKGROUND OF THE INVENTION

Prior to the advent of the present invention, there has been a long-felt and ever increasing demand for power driven portable cutting systems which can be used in a wide variety of agricultural and/or forest related applications such, for example, as in the harvesting of Christmas trees, forest thinning operations, removal of brush in forest maintenance and/or reforestation projects, etc.; as well as in similar cutting operations. Indeed, as the ensuing detailed description proceeds, those skilled in the art will appreciate that in its broader aspects the present invention also fills a further somewhat related need for reliable power equipment which is characterized by low energy consumption requirements and which can be employed on a cost-effective basis for mowing fields, lawns and similar vegetated areas.

Many different types of systems have been developed for use in such cutting applications; and, indeed, a wide variety of such systems have been, and are being, employed today including, but not limited to, a multiplicity of different types of power mower devices. Two such tree cutting systems are disclosed in, for example, U.S. Pat. Nos. 3,627,022—Fulghum, Jr. and 3,857,425—Wiklund. Thus, in the aforesaid Fulghum, Jr. patent, the patentee discloses a timber shearing apparatus wherein a shear blade is hydraulically driven towards an anvil for purposes of cutting a tree trunk positioned within the jaws of the apparatus. Wiklund, on the other hand, discloses a power operated frusto-spherical, cap-shaped saw blade which is also moved through a cutting path by means of an hydraulic cylinder. No provision is made in either of these patent disclosures for storing potential energy in an energy accumulation device and thereafter utilizing such stored potential energy to drive a cutting blade through a cutting path.

Other conventionally employed apparatus used for purposes of felling timber, harvesting Christmas trees, and the like include power-operated chain saws as well as axes and similar cutting devices, all of which are highly dangerous and require considerable expertise and dexterity on the part of the user in order to effectively employ such equipment for their intended purposes without inflicting injury to and/or otherwise fatiguing the user.

SUMMARY OF THE INVENTION

The present invention provides simple, relatively inexpensive, energy efficient, power operated cutting systems which can be readily used by relatively untrained individuals for purposes of cutting a wide variety of objects—e.g., particularly, but not exclusively, timber, Christmas trees and similar vegetation; and, which may also be used to cut steel or other metal, synthetic or natural objects—yet, wherein the perilous operation conventionally associated with such cutting equipment is essentially avoided. More specifically, the present invention employs a system wherein the cutting blade(s) is (are) driven by means of stored potential energy—for example, in the form of compressed gas, other suitable compressed fluid, or in a compressed spring or the like—which is permitted to expand so as to generate sufficient kinetic energy as to drive the cutting element(s) through its (their) cutting cycle; and, wherein inertial forces developed by at least certain of the driven components and, in some instances, excess kinetic energy developed which is not required for the cutting operation, is and/or are employed to at least partially recompress the expanded motive fluid or spring prior to a subsequent cutting cycle.

To this end, the various exemplary embodiments of the invention disclosed and hereinafter described contemplate a rotatable cutting blade which is driven through a substantial portion of its rotational cutting path by means of expanding gases (or expanding compressed spring means) which are contained within a piston/cylinder combination—e.g., an "accumulator"'—for purposes of shifting the piston axially through a power expansion stroke and converting lineal piston movement to rotational movement of the blade supporting shaft through a suitable crankshaft. The arrangement is such that inertial forces generated during the power expansion drive stroke by at least certain of the rotationally driven components—such, for example, as the crankshaft—can be employed to initiate reverse axial piston movement during its compression stroke for permitting at least partial recompression of the expanded fluid medium or spring, with full recompression being obtained by means of a fluid actuated positioning mechanism and a suitable, but completely conventional, one-way positioning clutch coupled to the crankshaft, such as a one-way positioning clutch which is driven unidirectionally by a hydraulic motor. However, as the ensuing description proceeds, those skilled in the art will appreciate that in its broader aspects, the present invention readily permits of use of the energy conversion systems described herein in conjunction with lineal and/or reciprocating cutting systems (not shown) with equal facility.

As a consequence of the foregoing arrangement, the cutting blade may be driven rapidly through its effective cutting path—e.g., through a Christmas tree trunk, vegetation or similar natural, synthetic or metal objects—so as to shear the object(s) being cut without shattering and/or splitting the object(s), an undesirable result that is prevalent in most timber shearing operations, particularly when the cutting operation is being conducted at relatively low temperature conditions. The various systems disclosed and described herein have further proven to be not only highly effective but, additionally, highly energy efficient.

DESCRIPTION OF THE DRAWINGS

These and other objects and advantages of the present invention will become more readily apparent upon reading the following detailed description and upon reference to the attached drawings, in which:

FIG. 3B illustrating the apparatus with the accumulator piston and crankshaft in their top dead center positions in readiness for a fluid operated cutting stroke; and, FIG. 3C illustrating the apparatus as the completion of the power driven cutting stroke with the piston and crankshaft having passed their respective bottom dead center positions;

FIGS. 10A through 10C are diagrammatic bottom views of the apparatus shown in FIG. 9, here respectively depicting the apparatus: (i) in an inactive static position preparatory to a cutting operation (FIG. 10A); (ii) at that point in an operational cutting cycle where the accumulator piston is at top dead center in readiness to initiate a cutting operation (FIG. 10B); and (iii), wherein the accumulator piston is at bottom dead center immediately following completion of the cutting operation and at the beginning of its compression stroke wherein the rotating blade is driven in the opposite direction preparatory to the next cutting operation;

Figure 1:
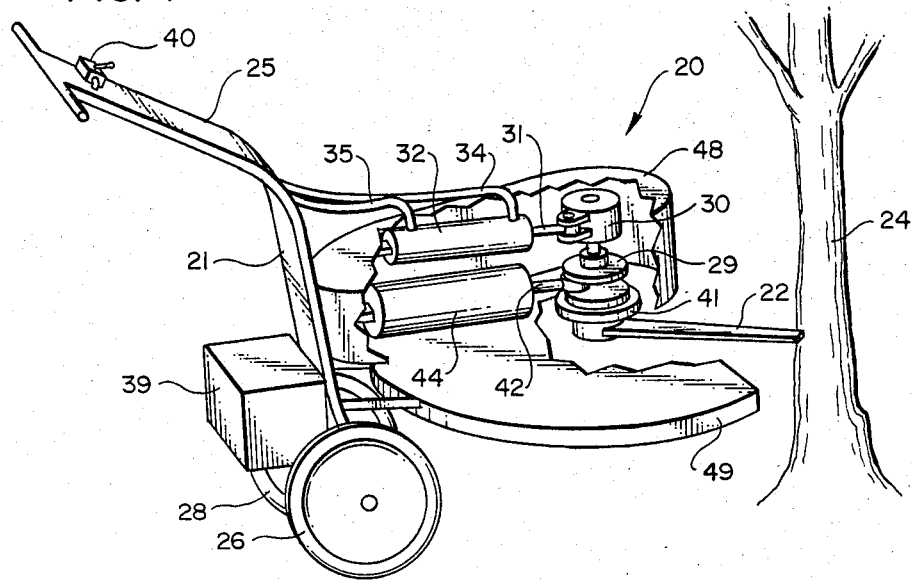
FIG. 1 is a fragmentary perspective view, partially cut away to reveal interior components, of a highly simplified tree cutting apparatus embodying features of the invention and which is particularly, but by no means exclusively, suited for cutting Christmas trees, brushing and/or similar timber thinning operations.

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, equivalents and alternatives falling within the spirit and scope of the invention as expressed in the appended claims.

DETAILED DESCRIPTION

Figure 2:
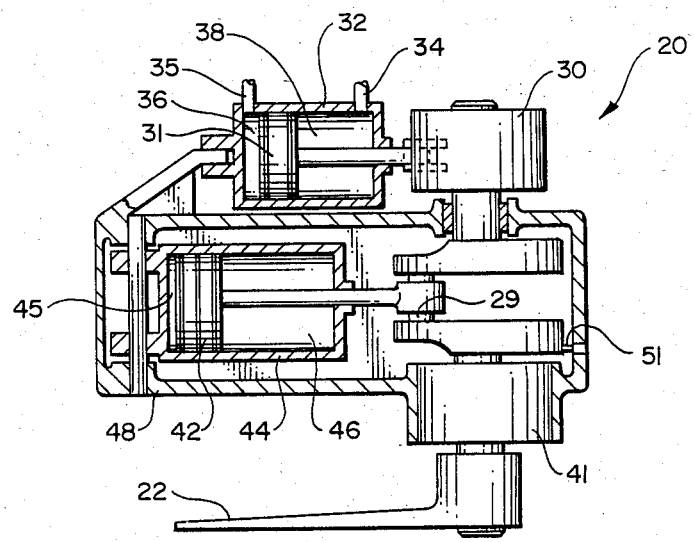
FIG. 2 is a fragmentary, vertical elevational view, partially in section, here illustrating details of the operating components employed in the cutting device shown in FIG. 1.

Turning now to the drawings, and with particular attention being initially directed to FIG. 1, there has been illustrated in highly diagrammatic form a simple cutting apparatus, generally indicated at 20, embodying features of the present invention—such apparatus 20 having here been illustrated in the form of a portable cutting device mounted on a wheeled frame 21 and having a rotatable cutting blade 22 adapted to be unidirectionally driven through a 360° cutting angle for cutting, for example, a Christmas tree 24 or similar natural, synthetic or metal objects. To this end, the apparatus frame 21 is generally upright, terminating at its uppermost end in a rearwardly projecting handle assembly 25, and having a pair of ground-engaging wheels 26, 28 journaled for rotation at the lower extremity of the frame 21. Blade 22 is mounted on the lower end of a generally vertical crankshaft 29 having its uppermost end coupled through a conventional one-way clutch 30 to a fluid actuated piston/cylinder combination 31/32. Thus, as best illustrated in FIG. 2, the piston/cylinder combination 31/32 includes a double-acting reciprocating piston 31 mounted within a positioning cylinder 32 and a pair of inlet/outlet lines 34, 35 for coupling the cylinder chambers 36, 38, respectively, on opposite sides of piston 31 to a suitable source of pressurized fluid, shown in FIG. 1 in block form as a conventional source of motive power—e.g., an hydraulic pump 39. The power means employed for driving the hydraulic pump 39 are completely conventional and, therefore, are neither illustrated nor described in detail herein. Rather, it should suffice to state that the pump 39 may be powered by a conventional motor (not shown); while a suitable and completely conventional control valve 40 is preferably mounted on the handle assembly 25 in a position to permit convenient operation by the user so as to enable pressurization and depressurization of the cylinder chambers 36, 38 during a crankshaft positioning cycle on the one hand and during repositioning of the outer shell of the conventional one-way positioning clutch 30 following each cutting revolution of blade 22 and preparatory to initiation of the next succeeding cutting revolution. A second completely conventional one-way clutch 41, which may be identical to clutch 30, is preferably mounted in the apparatus frame at the output end of crankshaft 29 for preventing reverse rotation of the crankshaft during repositioning of the outer shell on the positioning clutch 30.

In order to provide a source of stored potential energy for driving the cutting blade 22 rotationally, the exemplary apparatus 20 includes a second piston/cylinder combination 42/44 (FIGS. 1 and 2) or "accumulator" pivotally mounted to the frame 21 and having its piston 42 coupled directly to crankshaft 29. In carrying out the invention as incorpoated in the exemplary embodiment shown in FIGS. 1 and 2, the accumulator 42/44 is preferably designed such that cylinder chamber 45 may be initially charged with a compressible fluid— e.g., a suitable pressurized gas—at any appropriate operating pressure such, merely by way of example, as 1,000 psi; while cylinder chamber 46 may be vented to atmosphere (not shown) or, if desired, may be maintained at a relatively low, or even negative, pressure.

To enhance the safety of the apparatus 20 and to shield the rotating components, exemplary apparatus is preferably provided with a housing 48 and a blade cover or guard 49 which are secured to, mounted on, and supported by the frame 21 in any suitable manner, as best shown in FIG. 1.

Figure 3A:
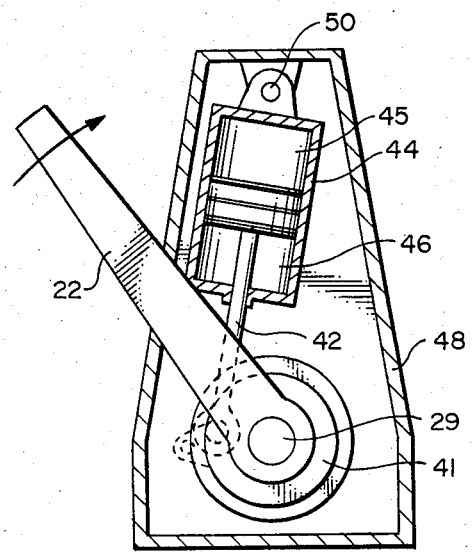
FIGS. 3A through 3C are bottom views, partially in section, of the cutting apparatus shown in FIGS. 1 and 2, here illustrating the cutting blade, accumulator and crankshaft in three successive operating positions during a single cutting revolution—viz., FIG. 3A illustrating the apparatus during the compression cycle of the accumulator while the fluid medium is being compressed.
Figure 3B:
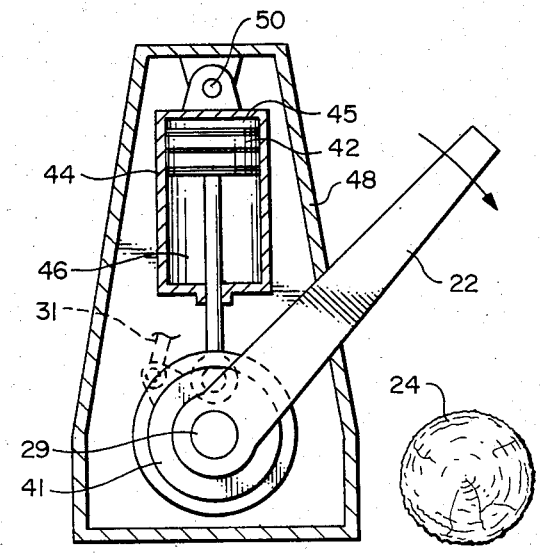
Figure 3C:
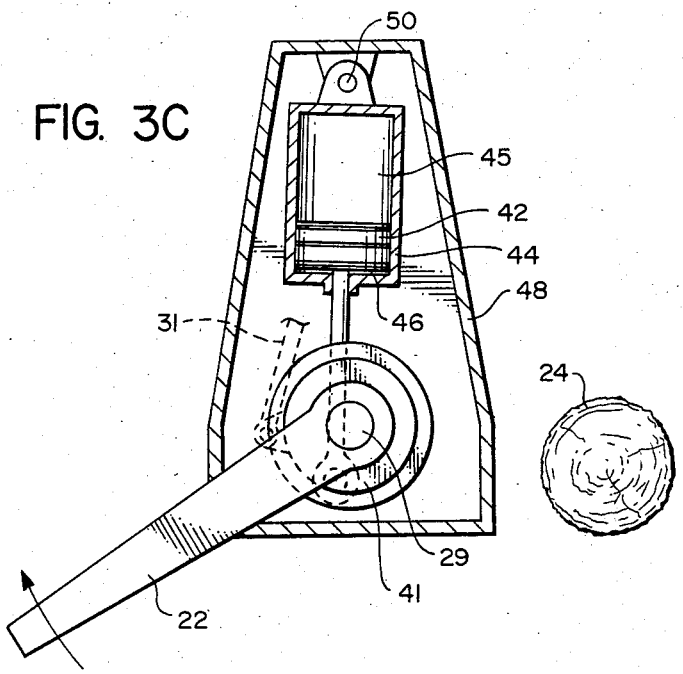

In operation, and as will best be understood by reference to FIGS. 1, 2 and 3A through 3C conjointly, the operator will first position the handle mounted control valve 40 so as to pressurize chamber 38 (FIG. 2) in the positioning piston/cylinder combination 31, 32, thus urging the piston 31 to the left as viewed in FIG. 2 and, through the one-way clutch 30, rotating crankshaft 29 in a clockwise direction as viewed in FIGS. 3A–3C from the position shown in FIG. 3A to that shown in FIG. 3B wherein the piston 42 of the accumulator 42/44 is in its top dead center position, fully compressing the gas charge contained within accumulator chamber 45 (FIGS. 2 and 3B). At this point in the operation, additional incremental movement of positioning piston 31 to the left as viewed in FIG. 2 serves to rotate the crankshaft 29 in a clockwise direction as viewed in FIG. 3B through a sufficient angle as to pivot accumulator cylinder 44 in a counterclockwise direction about its pivotal connection 50 to housing 48; and, as a consequence, accumulator piston 42 moves slightly past its top dead center position shown in FIG. 3B. Under these conditions, the compressed fluid medium in accumulator chamber 45 is permitted to rapidly expand, driving accumulator piston 42 downwardly and imparting sufficient rotational torque to the crankshaft 29 to rapidly drive the shaft and cutting blade 22 secured thereto in a clockwise direction through a rotational angle of approximately 180° from the position shown in FIG. 3B towards that shown in FIG. 3C, thus rapidly shearing the tree trunk 24. Due to the inertial forces generated as a result of such rapid rotation of the crankshaft 29 and blade 22, sufficient energy is provided to cause the blade 22 and shaft 29 to continue their clockwise rotation beyond the point shown in FIG. 3C, thus initiating upward axial movement of accumulator piston 42 and partially recompressing the expanded fluid medium in accumulator chamber 45.

As such time as the inertial forces are completely dissipated, the crankshaft 29 and blade 22 cease rotating in a clockwise direction; but, at this point in the operation cycle, the one-way positioning clutch 41 located at the output end of crankshaft 29 serves to prevent expansion of the partially compressed fluid medium in accumulator chamber 45 which would otherwise serve to drive the accumulator piston 42 downwardly tending to drive the crankshaft 29 and blade 22 in a counterclockwise direction.

Once the accumulator piston 42 has passed the top dead center position shown in FIG. 3B and commenced its power expansion cutting stroke, the operator manually shifts control valve 40 (FIG. 1) so as to depressurize chamber 38 and pressurize chamber 36 in positioning cylinder 32 (FIG. 2), thus driving positioning piston 31 to the right as viewed in the drawing and rotating the outer shell of the one-way positioning clutch 30 in the opposite direction in preparation for a further positioning cycle. Consequently, when the cutting blade 22 and crankshaft 29 complete their power driven cutting stroke, the positioning one-way clutch 30 may be again actuated by the operator in the manner previously described through manipulation of control valve 40 to again pressurize chamber 38 in positioning cylinder 32 so as to cause the positioning piston 31 to shift to the left as viewed in FIG. 2, thus driving the crankshaft 29 and cutting blade 22 in a clockwise direction towards and through the position shown in FIG. 3A, and towards the position shown in FIG. 3B where the accumulator piston 42 is again at its top dead center position in readiness for the next cutting operation. Moreover, if desired, the apparatus may include a suitable conventional limit switch 51 (FIG. 2) for sensing the rotational position of the crankshaft 29 and for controlling a suitable and completely conventional electrical or hydraulic circuit (not shown) for temporarily prohibiting further pressurization of chamber 38 in positioning cylinder 32, thus causing rotational movement of the rotatable cutter components—e.g., the crankshaft 29 and blade 22—to terminate at a point just prior to the time that the accumulator piston 42 reaches the top dead center position shown in FIG. 3B. As a consequence of this arrangement, the operator may move the cutting apparatus 20 (FIG. 1) to a new position proximate the next tree 24 or other object to be cut, at which point the cutting cycle may be again manually initiated through any desired override circuitry (not shown) which enables further pressurization of chamber 38 in positioning cylinder 32 and consequent additional clockwise rotational movement of crankshaft 29 so as to shift accumulator piston 42 past its top dead center position (FIG. 3B) and to again initiate a power cutting stroke. And, of course, those skilled in the art will appreciated that when the exemplary apparatus 20 shown in FIG. 1 is intended to function as a high speed, continuously rotating cutter—e.g., when it is to function as a power mower, debrusher, thinner, or the like—it is within the scope of the invention to provide a completely conventional closed loop hydraulic system wherein the positioning piston/cylinder combination 31/32 is automatically operated as a function of the position of the crankshaft 29, in which event the control valve 40 would be replaced by manually operable START/STOP switches (not shown).

Figure 4:
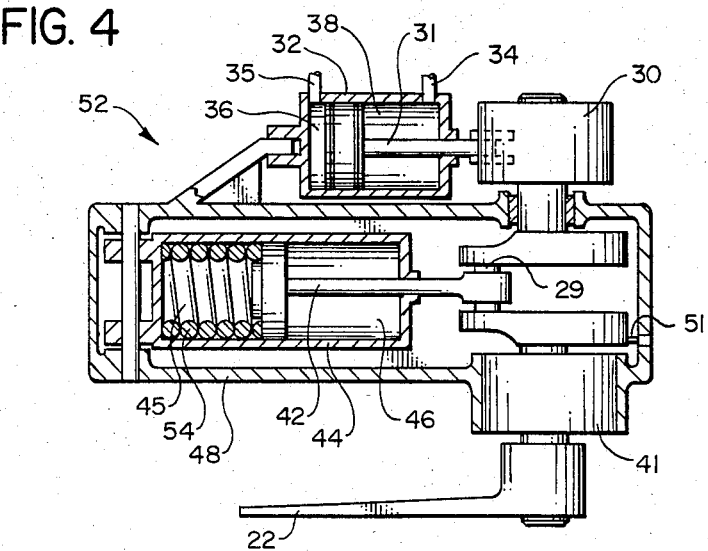
FIG. 4 is a fragmentary, vertical elevational view, partly in section, of a slightly modified cutting apparatus similar to that shown in FIGS. 1-3C and also embodying features of the present invention.

As thus far disclosed, the exemplary form of the invention depicted in FIGS. 1–3C has been illustrated and described in connection with apparatus 30 employing a fluid actuated accumulator 42/44. However, those skilled in the art will appreciate that the accumulator 42/44 need not be fluid actuated; but, rather, can take other forms without departing from the spirit and scope of the invention, at least insofar as provision is made for storing potential energy used to drive the cutter blade 22 through its cutting stroke. Thus, referring to FIG. 4, it will be noted that a modified cutting apparatus, generally indicated at 52, has been shown which, in terms of overall structural configuration and operation, is essentially identical to the apparatus 20 shown and described above in connection with FIGS. 1–3C. Because of the virtual identity in structural components, like reference numerals have been used to designate identical components in the two exemplary embodiments. In this instance, however, rather than charging the accumulator chamber 45 with a pressurized gas or the like, a suitable compression-type coil spring 54 is positioned in the chamber 45 with one end bottomed on accumulator piston 42 and its opposite end bottomed at the end of the accumulator cylinder 44. The operation of the two systems—viz., the apparatus 20 of FIGS. 1–3C and the apparatus 52 shown in FIG. 4—is identical; but, in this instance, as the positioning piston/cylinder combination 31/32 is adjusted to shift the accumulator piston 42 to its top dead center position (i.e., to a position such as that shown in FIG. 3B), the compression-type coil spring 54 is compressed so as to store potential energy therein. Consequently, when the positioning piston/cylinder combination 31/32 serves to rotate the crankshaft 29 sufficiently far that the accumulator piston 42 passes its top dead center position, the compressed spring 54 is free to expand so as to convert the potential energy stored therein to kinetic energy, serving to drive the crankshaft 29 and cutter blade 22 through a power expansion cutting stroke.

Figure 5:
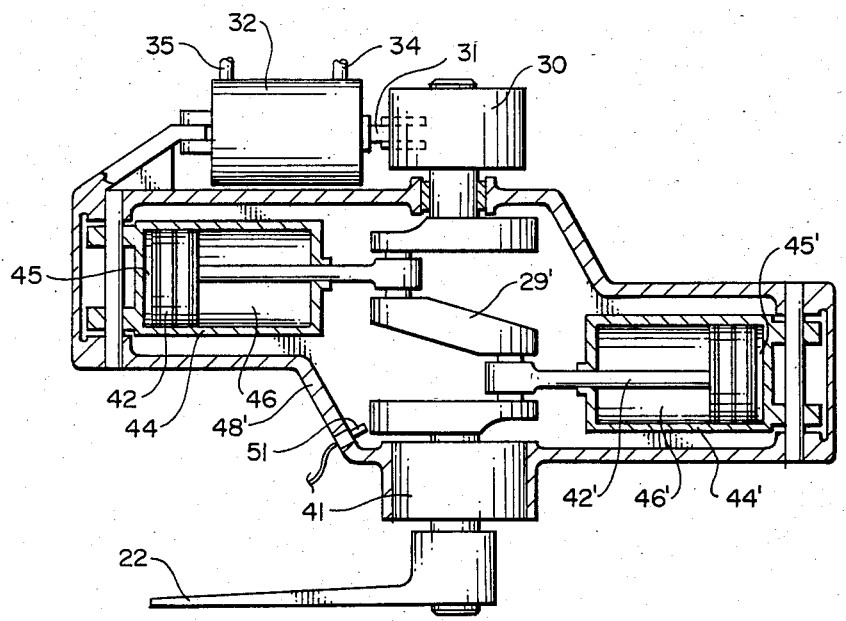
FIG. 5 is a fragmentary, vertical elevational view, partially in section, of yet another modified form of the invention similar to that depicted in FIG. 2, but here illustrating the apparatus with a pair of oppositely positioned accumulators acting in phase and serving to balance the forces imparted to the crankshaft.
Figure 6:
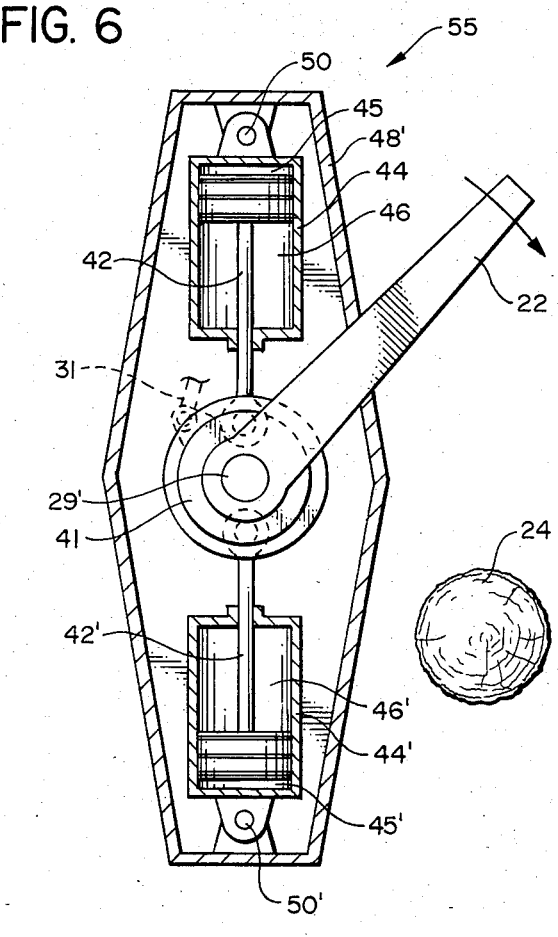
FIG. 6 is a bottom view, partially in section, of the apparatus shown in FIG. 5, here depicting the accumulator pistons in their top dead center positions in readiness for initiation of a cutting cycle.

Referring next to FIGS. 5 and 6, yet another exemplary embodiment of the invention has been illustrated and will be described below. In this instance, however, the exemplary cutting apparatus, generally designated at 55, is provided with a pair of identical accumulator piston combinations 42/44 and 42'/44' which are disposed on opposite sides of the crankshaft 29' and which are operated in phase. That is, in the exemplary embodiment shown in FIGS. 5 and 6, both accumulator pistons 42 and 42' are positioned at their top dead center positions so as to fully compress the gaseous or other fluid medium within the accumulator chambers 45, 45'. As a consequence, when the positioning piston/cylinder combination 31/32 is activated to shift the crankshaft 29' (in a clockwise direction as viewed in FIG. 6) sufficiently far that the accumulator pistons 42, 42' pass their top dead center positions—i.e., when accumulator cylinder 44 is pivoted slightly in a counterclockwise direction about its pivot point 50 and cylinder 44' is pivoted slightly in a counterclockwise direction about its pivot point 50'—the two accumulator pistons 42, 42' are free to operate in unison to drive the crankshaft 29' in a clockwise direction. This arrangement serves to balance the torsional forces imparted to the crankshaft 29 and renders the apparatus 55 considerably smoother in operation.

Figure 7:
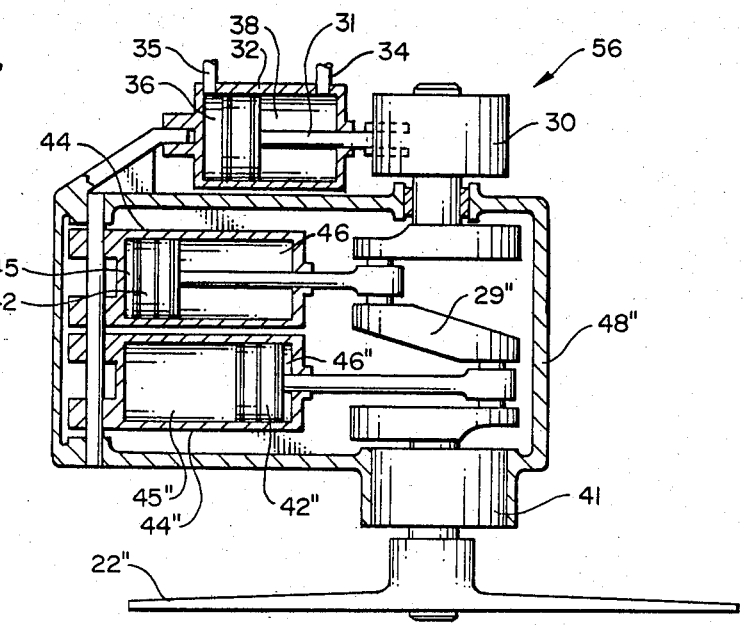
FIG. 7 is a fragmentary, vertical elevational view, partly in section, similar to FIGS. 2 and 5, but here illustrating yet another modified form of the invention employing two accumulators which are 180° out of phase for purposes of alternately driving the crankshaft through successive 180° angles.
Figure 8:
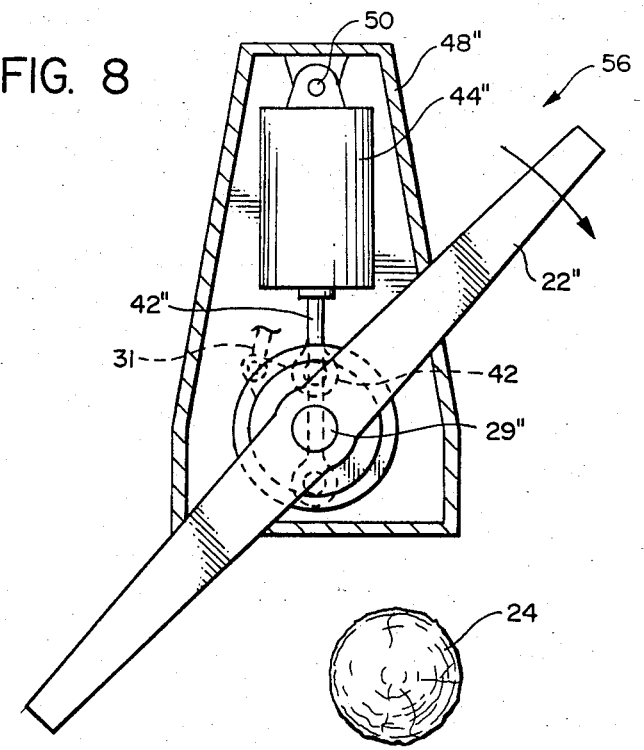
FIG. 8 is a bottom view of the apparatus shown in FIG. 7.

Turning next to FIGS. 7 and 8, a still further modified form of cutting apparatus embodying features of the present invention and generally illustrated at 56 has been shown. In this exemplary apparatus, as in the forms of the invention previously described in connection with FIGS. 5 and 6, a pair of identical "accumulator" piston/cylinder combinations 42/44 and 42"/44" are employed; but, unlike the forms of the invention shown in FIGS. 5 and 6 wherein the two accumulators are operated in phase, in FIGS. 7 and 8 they are operated out of phase so as to establish two sequential unidirectional power cutting strokes during successive 180° rotational increments of the driven crankshaft 29". Thus, as best shown in FIG. 7, it will be noticed that piston 42 is shown at its top dead center position with the gaseous or other expandable fluid medium contained within chamber 45 being fully compressed in readiness for driving crankshaft 29" through a 180° power cutting stroke. At the same time, however, piston 42" is in its bottom dead center position, with the gaseous or other fluid medium contained within chamber 45" having been fully expanded during the prior 180° cutting stroke. It will, therefore, be understood from the preceding discussion that as the positioning piston 31 continues to advance in its positioning cycle—as a result of pressurization of chamber 38 in positioning cylinder 32—the accumulator piston 42 will pass its top dead center position; and, at that instant the compressed gaseous medium within chamber 45 rapidly expands, serving to rapidly drive the piston 42 to the right as viewed in FIG. 7 and initiating powered rotation of driven crankshaft 29" in a clockwise cutting stroke as viewed in FIG. 8.

During the initial portion of the powered cutting stroke—for example, as the crankshaft 29" and blade 22" are driven through a rotational cutting angle of about 135°—piston 42" associated with the second accumulator 42"/44" moves to the left as viewed in FIG. 7 from its bottom dead center position, thus recompressing the gaseous medium within cylinder chamber 45". When the crankshaft 29" and blade 22" have moved through a powered cutting angle of about 90°, the pressure of the gaseous medium undergoing compression in chamber 45" and the expanding gaseous medium in chamber 45 will be substantially equal; but, the inertial forces generated by the crankshaft 29" and blade 22" during the rapid power cutting stroke serve to continue to drive the shaft 29" and blade 22 through an additional angle of approximately 45°. At that point in the operational cycle, the inertial forces are fully dissipated and the gaseous medium within chamber 45" is at a considerably higher pressure than that within chamber 45. However, the crankshaft 29" and blade 22" are precluded from rotating in a reverse direction—i.e., counterclockwise as viewed in FIG. 8—by the one-way clutch 41. The positioning piston/cylinder combination 31/32 is now manually operated in the manner previously described to continue powered clockwise rotation of the crankshaft 29" and blade 22" until such time as piston 42 is in its bottom dead center position and piston 42" is in its top dead center position. Continued movement of the positioning piston 31 now serves to shift accumulator piston 42" past its top dead center position, thus enabling accumulator 42"/44" to initiate a second power cutting stroke of approximately 135° wherein the gaseous medium within chamber 44" rapidly expands and the expanded gaseous medium within chamber 44 is partially recompressed.

Those skilled in the art will, therefore, appreciate that in the embodiment of the invention described in FIGS. 1 through 6, the accumulator(s) serve(s) to drive the crankshafts 29, 29' and blade 22 through a powered cutting stroke of approximately 180° with inertial forces powering the rotatable components through an additional angle on the order of approximately 90°, at which point the apparatus is repositioned for a subsequent identical cutting stroke; whereas in the embodiment of the invention shown in FIGS. 7 and 8, a first accumulator 42/44 drives the crankshaft 29" and blade 22" through a power driven cutting angle of approximately 90° with inertial forces carrying the rotatable components through an additional angle of about 45°, and after repositioning, the second accumulator 42"/44" serves to power the rotatable components through an identical cutting stroke.

In all of the embodiments of the invention herinabove described, the drive shafts 29, 29', 29" and blades 22, 22" are driven unidirectionally through rotational cutting angles. However, in its broader aspects, those skilled in the art will appreciate that the invention is not limited to such arrangements. Thus, merely by way of example, the accumulator pistons could, if desired, be coupled directly to a suitable cutting blade which is constrained from movement in a linear path (not shown). Alternatively, the apparatus can be designed so as to move the cutting blade through a pendulous or oscillatory cutting path—e.g., in the manner shown in FIGS. 9 through 10C.

Figure 9:
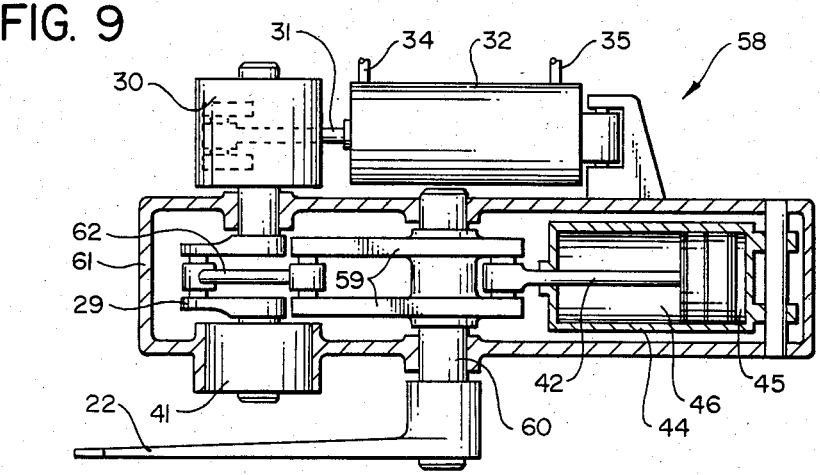
FIG. 9 is a fragmentary, vertical elevational view, partially in section, of yet another slightly modified form of the invention, here employing a crankshaft and connecting linkage arrangement for driving the cutting blade through an oscillatory path as opposed to a rotational path.

To this end, and as best illustrated by reference first to FIGS. 9 and 10A conjointly, it will be observed that there has been illustrated a modified cutting apparatus, generally indicated at 58, wherein the accumulator piston 42 is not coupled directly to crankshaft 29 as in the previous embodiments, but, rather, the piston 42 is coupled to one end of a bifurcated arm 59 splined or otherwise non-rotatably mounted on a shaft 60 journaled for rotation in housing 61 and having a cutting blade 22 rigidly secured thereto for rotation in unison with shaft 60 and arm 59. In carrying out this aspect of the invention, the opposite end of bifurcated arm 59 is coupled to the crankshaft 29 by means of a connecting rod 62.

Figure 10A:
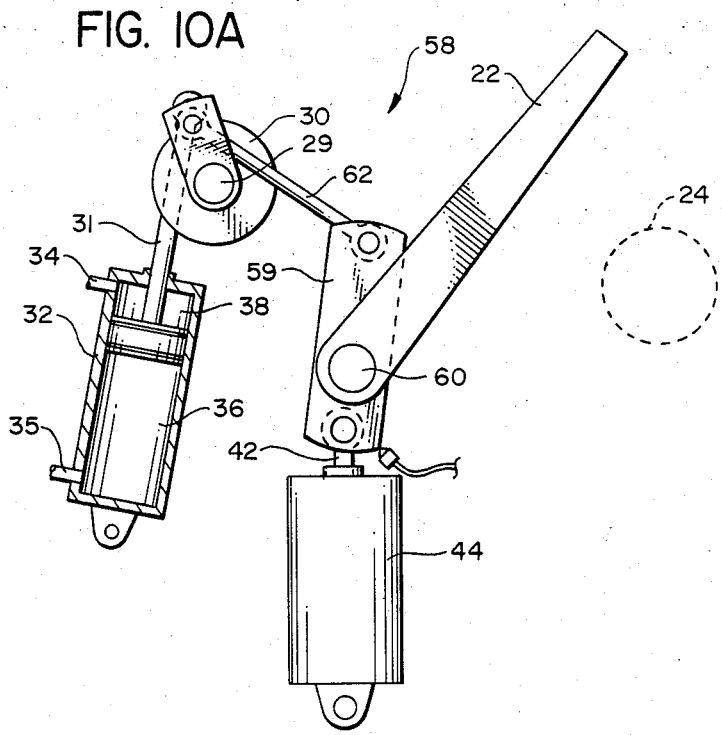

In operation, the various components of the apparatus 58 are initially in the relative positions shown in FIG. 10A wherein accumulator piston 42 is slightly past its top dead center position tending to drive the arm 59, shaft 60 and blade 22 in a clockwise direction (as viewed in the drawings) through a powered cutting stroke; but, such operation is inhibited by the one-way clutch 30 which permits rotation of crankshaft 29 only in a counterclockwise direction. As shown in FIG. 10A, crankshaft 92 is positioned just short of its top dead center position; and, consequently, the apparatus 58 is in readiness for a cutting operation upon initiation of such operation by user actuation of the positioning piston/cylinder combination 31/32 in the manner previously described.

Thus, to initiate a cutting operation, the user manipulates the handle mounted control valve on the apparatus (not shown in FIG. 10A, but similar to the valve 40 shown in FIG. 1) so as to pressurize chamber 38 in positioning cylinder 32. As a consequence, positioning piston 31 moves downwardly from the solid line position shown in FIG. 10A (the dotted line position shown at 31 in FIG. 10B) towards the solid line position 31a shown in FIG. 10B, thus rotating crankshaft 29 in a counterclockwise direction from the solid line position shown in FIG. 10A (the dotted line position 29 shown in FIG. 10B) to the solid line position 29a shown in FIG. 10B where the crankshaft 29 is in its top dead center position. It will, of course, be appreciated that as the crankshaft 29 moves towards its top dead center position shown at 29a in FIG. 10B, the connecting rod 62 serves to rotate the bifurcated arm 59 in a counterclockwise direction about the axis of shaft 60, thus serving to shift the accumulator piston 42 to its top dead center position and, at the same time, rotating blade 22 slightly in a counterclockwise direction.

As the positioning piston 31 continues to move downwardly towards the position shown in solid lines at 31b in FIG. 10C, crankshaft 29 moves past top dead center; and, as a consequence, connecting rod 62 serves to rotate arm 59 in the reverse direction—i.e., clockwise as viewed in FIGS. 10A through 10C—back towards and through the position shown in FIG. 10A. At this point in the operational cycle, since both crankshaft 29 and accumulator piston 42 are positioned slightly past top dead center, one-way clutch 30 no longer inhibits clockwise rotation of the bifurcated arm 59 and, therefore, the compressed gaseous medium or other source of stored potential energy within cylinder 44 is permitted to rapidly expand, shifting actuator piston 42 upwardly from the position shown in FIG. 10B towards that shown in FIG. 10C, thus driving the arm 59 and cutting blade 22 rapidly through a powered cutting stroke of approximately 60°. Once again, inertial forces generated serve to power the crankshaft 29 past its bottom dead center position shown in FIG. 10C, thus initiating counterclockwise rotation of crankshaft 29 and blade 22 and partially recompressing the fully expanded potential energy storage medium within accumulator cylinder 44. During the power driven cutting stroke of the blade 22, the operator is free to reverse the outlet/inlet ports 34/35 associated with positioning cylinder 32 so as to pressurize chamber 36 and shift piston 31 upwardly from the position shown in FIG. 10C towards that shown in FIG. 10A, thus rotating the outer shell of one-way clutch 30 and again preparing the apparatus 58 for a further cutting operation. At such time as the outer shell of one-way clutch 30 is being repositioned, one-way clutch 40 (FIG. 9) precludes clockwise movement of crankshaft 29.

Once the movable components of the apparatus 58 again reach the approximate position shown in FIG. 10A, arm 59 engages limit switch 51, thus temporarily inhibiting the flow of pressurizing fluid medium to positioning cylinder 32 and causing the operating components of the cutting to dwell in such position until the operator of the equipment again overrides the dwell mechanism to start another cutting cycle by again causing the positioning piston/cylinder combination 31/32 to shift crankshaft 29 towards and through its top dead center position as shown in FIG. 10B.

Figure 11:
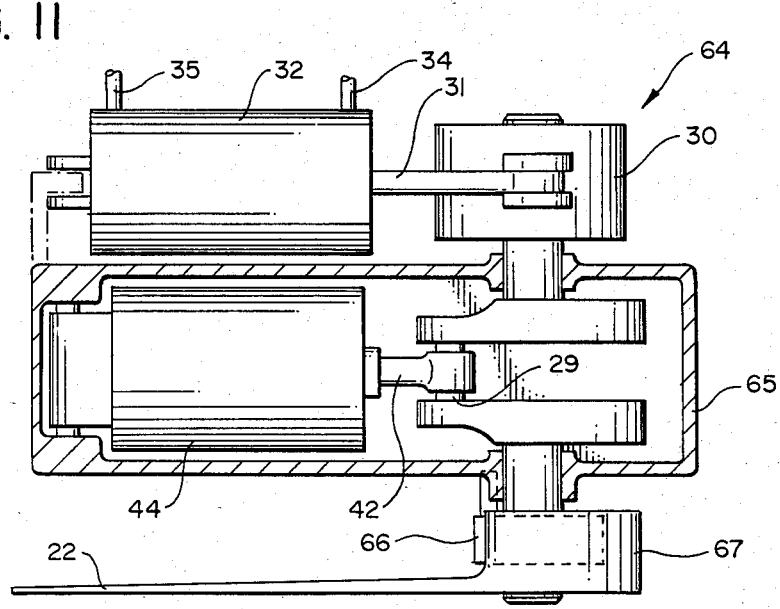
FIG. 11 is a fragmentary, vertical elevational view, partly in section, similar to FIG. 2, but here illustrating the apparatus employing only a single one-way clutch in conjunction with a one-way ratcheting latch mechanism; and, FIG. 12 is a bottom view of the apparatus shown in FIG. 11.
Figure 12:
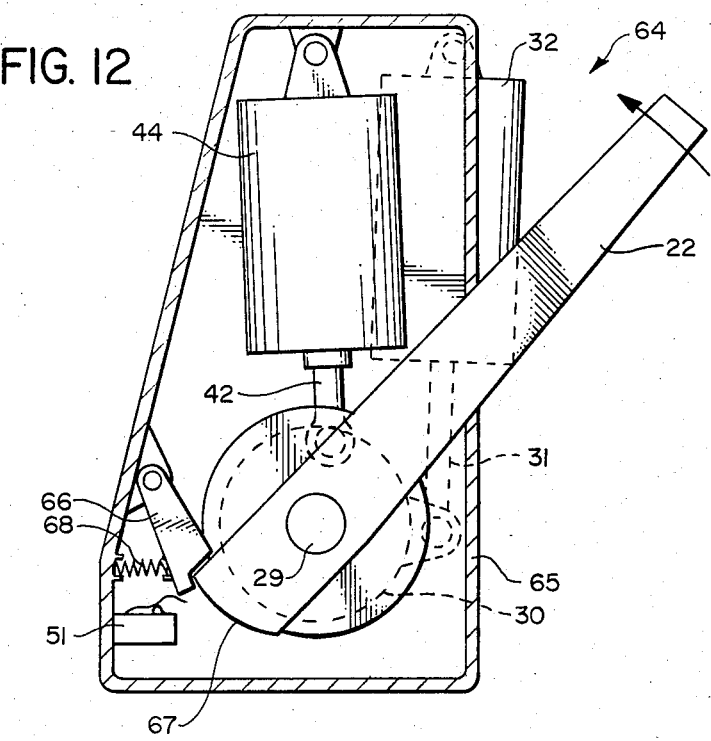

Referring next to FIGS. 11 and 12, yet another slightly modified form of cutting apparatus, generally indicated at 64, has been illustrated which, although embodying the features of the invention heretofore described, requires only a single one-way clutch 30 and which avoids the need for employing a second one-way clutch such as that shown at 41 in FIGS. 1 through 9. To this end, the apparatus 64 includes a housing 65 within which crankshaft 29 is journaled for rotation with one end of the crankshaft 29 being received within positioning one-way clutch 30 and cutting blade 22 splined or otherwise drivingly connected to the opposite end of the crankshaft. As in the previous embodiment of the invention, an accumulator 42/44 is used to store potential energy for driving the crankshaft 29 and cutting blade 22—this time, in a counterclockwise direction as viewed in FIG. 12—when the accumulator piston 42 passes slightly beyond its top dead center position; and, a positioning piston/cylinder combination 31/32 is used to power the crankshaft 29 through one-way clutch 30 so as to rotate the crankshaft 29 towards and through its top dead center position. However, rather than employing a second one-way clutch to prevent rotation of the operating components during repositioning of the outer shell of clutch 30, the exemplary apparatus 64 includes a spring-biased latch 66 for preventing clockwise rotation of the blade 22 and shaft 29 when the accumulator 42/44 is located just to the right of top dead center as viewed in FIG. 12. Thus, with the operating component of apparatus 64 in the position shown in FIG. 12, it is merely necessary to retract piston 31 so as to shift the one-way clutch 30 in a counterclockwise direction, thereby rotating crankshaft 29 in a counterclockwise direction and moving the accumulator piston 42 towards and through its top dead center position. At this point, the compressed gaseous medium or other source of stored potential energy within accumulator cylinder 44 is allowed to rapidly expand, driving the crankshaft 29 and cutting blade 22 rapidly through a counterclockwise cutting stroke. At such time as the accumulator piston 42 reaches the bottom of its expansion power cutting stroke, inertial forces generated by the crankshaft 29 and blade 22 serve to continue the counterclockwise rotation thereof, thus partially recompressing the expanded gaseous medium within cylinder 44. When the inertial forces developed are fully dissipated, one-way clutch 30 serves to preclude reverse or clockwise rotation of the shaft 29 and blade 22. At this point in the operating cycle, the positioning piston 31 is retracted so as to complete the counterclockwise rotation of the moving components, with the raised end 67 of blade 29 serving to cam the spring-biased latch to the left as viewed in FIG. 12, permitting the blade end 67 to pass the latch 66 which then snaps back under the biasing force exerted by spring 68 to prevent clockwise rotation of the blade and shaft. Such movement of the latch 66 is sensed by a suitable limit switch 51 which serves to deactivate the positioning piston/cylinder combination 31/32 when the components reach the positions shown in FIG. 12, thus allowing the user to reposition the outer shell of one-way clutch 30 while latch 66 prevents reverse or clockwise rotation of blade 22 and shaft 29.

Thus, those skilled in the art will appreciate that there have herein been disclosed various forms of cutting apparatus embodying features of the invention which are characterized by their simplicity, ruggedness, compactness and reliability in operation; and, wherein means are provided for storing potential energy in piston/cylinder type accumulators in which the accumulator is disabled until such time as it reaches its top dead center position with the gaseous medium or other source of stored potential energy being fully compressed. At that point in the operating cycle, the accumulator is enabled, allowing the fully compressed potential energy storage medium to rapidly expand so as to drive a suitable cutting blade coupled to the accumulator piston through a powered cutting stroke. Inertial forces developed during the powered cutting stroke serve to partially recompress the expanded gaseous medium or other potential energy storage means; and, when such interial forces are fully dissipated, a one-way positioning mechanism serves to prevent reverse movement of one or more of the movable components while the accumulator piston is being repositioned at its top dead center position with the potential energy storage medium contained within the accumulator cylinder being fully compressed and ready for the next cutting cycle.

What is claimed is:

1. The method of powering a cutting blade through a cutting stroke comprising the steps of:

(a) coupling the blade to a reciprocable piston in a piston/cylinder type accumulator containing a compressible potential energy storage medium;

(b) shifting the accumulator piston axially within the accumulator cylinder towards a top dead center position therein wherein the compressible potential energy storage medium is fully compressed;

(c) positively precluding reverse axial movement of the accumulator piston during step (b) so as to prevent expansion of the compressible potential energy storage medium;

(d) shifting the accumulator piston axially in the opposite direction past its top dead center position so as to permit rapid expansion of the compressible potential energy storage medium for rapidly driving the cutting blade through its cutting stroke;

(e) employing the inertial forces generated by the rapidly driven cutting blade and the coupling thereof to the accumulator piston to drive the accumulator piston in the opposite direction upon completion of the blade cutting stroke and thereby at least partially recompressing the compressible potential energy storage medium;

(f) shifting the accumulator piston axially within the accumulator cylinder towards a top dead center position therein wherein the compressible potential energy storage medium is again fully compressed; and, (g) positively precluding reverse axial movement of the accumulator piston during steps (e) and (f) so as to prevent expansion of the compressible potential energy storage medium.

2. The method as set forth in claim 1 wherein the cutting blade is mounted on a crankshaft for rotation therewith and the accumulator piston is coupled to the crankshaft for driving the blade through a rotational cutting stroke.

3. The method as set forth in claim 2 wherein a first one-way clutch is mounted on the crankshaft and is coupled to the piston in an operator controlled positioning piston/cylinder combination for selectively rotating the one-way clutch to drive the crankshaft and thus shift the accumulator piston towards and through its top dead center position during steps (b), (d) and (f).

4. The method as set forth in claim 3 wherein a holding mechanism is provided for preventing rotation of the crankshaft during repositioning of the outer shell of the one-way clutch.

5. The method as set forth in claim 4 wherein the holding mechanism comprises a second one-way clutch mounted on the crankshaft.

6. The method as set forth in claim 4 wherein the holding mechamism comprises a spring-biased latch for permitting rotation of the crankshaft and blade in one direction only.

7. The method as set forth in claim 1 wherein the cutting blade is mounted on a shaft for rotation therewith, an arm is mounted on the shaft for rotation therewith, the accumulator piston is coupled to one end of the arm, the opposite end of the arm is coupled to a crankshaft, a one-way positioning clutch is mounted on the crankshaft, and the piston of a manually operated positioning piston/cylinder combination is drivingly coupled to the one-way clutch, whereby movement of the positioning piston in a first direction serves to rotate the one-way clutch, thus driving the crankshaft and rotating the arm so as to shift the accumulator piston towards and through its top dead center position and enabling the accumulator power expansion stroke only when the crankshaft is past its top dead center position.

8. The method as set forth in claim 7 wherein a holding mechanism is provided for preventing rotation of the crankshaft during repositioning of the outer shell of the one-way clutch.

9. The method as set forth in claim 8 wherein the holding mechanism comprises a second one-way clutch mounted on the crankshaft.

10. Apparatus for cutting trees, vegetation and other objects comprising, in combination:
   (a) a cutting blade;
   (b) an accumulator piston/cylinder combination for storing a compressible potential energy storage medium;
   (c) means coupling said cutting blade to said accumulator piston for driving said blade through its cutting stroke during expansion of said compressible storage medium;
   (d) a positioning mechanism coupled to said accumulator piston for positively shifting said piston in the opposite direction upon completion of its expansion stroke towards and past its top dead center position during a compression stroke while the potential energy storage medium is recompressed;
   (e) means for preventing movement of said acumulator piston in an expansion stroke until said piston passes its top dead center position; and,
   (f) operator controlled means for actuating said positioning mechanism to shift said accumulator piston towards and through its top dead center position.

11. Apparatus as set forth in claim 10 wherein said means for coupling said blade to said accumulator piston comprises a crankshaft; said positioning mechanism includes a one-way clutch having an outer shell mounted on said crankshaft and a positioning piston/cylinder combination having its piston coupled to said outer shell; and, said operator controlled means for actuating said positioning mechanism includes means for driving said positioning piston in a first direction to rotationally drive said crankshaft and thereby shifting said accumulator piston towards and past its top dead center position, and for driving said positioning piston in a second direction to reposition said outer shell in preparation for the next succeeding cutting stroke.

12. Apparatus as set forth in claim 11 wherein said means for preventing movement of said accumulator piston in an expansion stroke until said piston passes its top dead center position comprises a second one-way clutch mounted on said crankshaft.

13. Apparatus as set forth in claim 11 wherein said means for preventing movement of said accumulator piston in an expansion stoke until said piston passes its top dead center position comprises a spring-biased latch coacting with one of said blade and said crankshaft for permitting rotation of said blade and said crankshaft in one direction only.

14. Apparatus for cutting trees, vegetation and other objects comprising, in combination:
   (a) an apparatus frame;
   (b) a crankshaft journaled for rotation in said frame;
   (c) a cutting blade mounted on said crankshaft for rotation therewith;
   (d) an accumulator piston/cylinder combination having its cylinder pivotally mounted on said frame, its piston coupled to said crankshaft, and containing a compressible potential energy storage medium;
   (e) a one-way clutch having an outer shell mounted on said crankshaft;
   (f) a positioning piston/cylinder combination having its cylinder pivotally connected to said frame and its piston connected to said outer shell;
   (g) operator controlled means for shifting said positioning piston in a first direction to rotationally drive said crankshaft through said one-way clutch for shifting said accumulator piston towards and past its top dead center position during an accumulator compression cycle for compressing said compressible potential energy storage medium and for shifting said positioning piston in a second direction to reposition said outer shell of said one-way clutch prior to the next succeeding portion of the operating cycle when said positioning piston is shifted in said first direction; and,
   (h) means for preventing rotation of said crankshaft during movement of said positioning piston in said second direction.

15. Apparatus as set forth in claim 14 wherein said means for preventing rotation of said crankshaft during movement of said positioning piston in said second direction comprises a second one-way clutch mounted on said frame and to which said crankshaft is coupled.

16. Apparatus as set forth in claim 14 wherein said means for preventing rotation of said crankshaft during movement of said positioning piston in said second direction comprises a spring-biased latch mounted on said frame in a position to interact with one of said crankshaft and said blade for permitting rotation thereof in one direction only.

17. Apparatus as set forth in claim 14 wherein the inertial forces generated by said driven crankshaft and driven blade during an expansion stroke of said accumulator are utilized to drive said accumulator piston in the opposite direction upon completion of the powered expansion cutting stroke towards its top dead center position so as to partially recompress the compressible potential energy storage medium within said accumulator cylinder.

18. Apparatus for cutting trees, vegetation and other objects comprising, in combination:
   (a) an apparatus frame;
   (b) a crankshaft journaled for rotation in said frame;
   (c) a blade shaft journaled for rotation in said frame;
   (d) a cutting blade mounted on said blade shaft for rotation therewith;
   (e) an arm mounted on said blade shaft for rotation therewith;
   (f) an accumulator piston/cylinder combination having its cylinder pivotally mounted on said frame, its piston coupled to one end of said arm; and containing a compressible potential energy storage medium;
   (g) a connecting rod coupling the opposite end of said arm to said crankshaft;
   (h) a one-way clutch having an outer shell mounted on said crankshaft;
   (i) a positioning piston/cylinder combination having its cylinder pivotally connected to said frame and its piston coupled to said outer shell;
   (j) operator controlled means for shifting said positioning piston in a first direction to rotationally drive said crankshaft through said one-way clutch for shifting said arm and thus shifting said accumulator piston towards and through its top dead center position during an accumulator compression cycle for compressing said compressible potential energy storage medium and for shifting said positioning piston in a second direction to reposition said outer shell of said one-way clutch prior to the next succeeding portion of the operating cycle when said postioning piston is shifted in said first direction; and, (k) means for preventing rotation of said crankshaft during movement of said positioning piston in said second direction.

19. Apparatus as set forth in claim 18 wherein said means for preventing rotation of said crankshaft during movement of said positioning piston in said second direction comprises a second one-way clutch mounted thereon.

* * * * *